May 19, 1931.   B. H. ANIBAL   1,806,569
RUBBER MOTOR MOUNTING
Filed July 27, 1927
Fig. 1
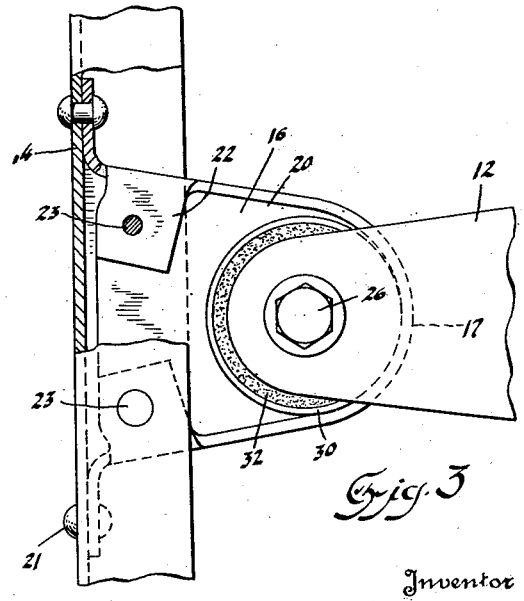
Fig. 2
Fig. 3
Inventor
Benjamin H. Anibal
By Blackmore, Spencer & Heath
Attorneys Patented May 19, 1931

1,806,569

UNITED STATES PATENT OFFICE

BENJAMIN H. ANIBAL, OF PONTIAC, MICHIGAN, ASSIGNOR TO GENERAL MOTORS CORPORATION, OF DETROIT, MICHIGAN, A CORPORATION OF DELAWARE

RUBBER MOTOR MOUNTING

Application filed July 27, 1927. Serial No. 208,886.

This invention relates to a vibration absorbing mounting of an engine in the chassis of an automotive vehicle.

It is an object of this invention to provide a vibration absorbing connection between the engine and frame which will effectively cushion the two and prevent the transmission of vibrations from one to the other. It is a further object of the invention to provide a simple connection of this type which will absorb vibrations in all directions and yet which will firmly hold the parts in place and permit but slight relative movement between the two.

Other objects of the invention will appear in the course of the following description, taken in connection with the accompanying drawings and appended claims:

In the drawings:

Figure 1 is a rear view of my improved engine mounting, partly in section.

Figure 2 is a transverse vertical section of a single connection between the engine and frame.

Figure 3 is a plan view of the structure shown in Figure 2, with parts broken away.

Referring to the drawings, the numeral 10 indicates a conventional internal combustion engine, mounted in its usual place in an automotive vehicle. The engine is provided with laterally extending arms 12 fixed thereto in the usual manner. As the connections between the arms 12 and their respective frame members 14 are identical, only one will be described.

Fitting within the angle frame member 14 is the engine supporting arm, indicated generally at 16. This arm comprises a lower horizontal portion 18, two transverse vertical side portions 20 and two horizontal upper portions 22. The lower portion 18 is formed with a socket 17 which comprises a segment of a sphere of comparatively large diameter as illustrated. The lower portion 18 is fixed to the lower portion of the frame member by rivet 19. The side portions are bent out and fixed to the vertical portion of the frame member by rivets 21 and the upper portions 22 are fixed to the upper portion of the angle frame member by rivets 23.

The arm 12 is formed for reception of a vertically extending bolt 26 which extends down through an aperture 28 in the socket 17. The aperture 28 is slightly larger than the bolt for allowing a limited amount of relative horizontal movement between the two. The outer lower part 13 of the arm 12 is formed the shape of a sector of a sphere corresponding to the socket 17. Between the socket 17 and lower portion 13 of arm 12 is a metallic washer 30 fitting in the socket 17 and having an upwardly extending flange, and between the washer 30 and the lower portion 13 of arm 12 is the cushioning strip 32 which is formed of some resilient material such as rubber. A cushioning washer 34 of similar resilient material surrounds the bolt 26 beneath the socket 17 and over this is the metallic washer 36 which is flanged as illustrated to surround the lower part of the washer 34, some clearance being provided between the washer 36 and socket 17.

By this arrangement there is provided a non-metallic contact between the arms 12 and 16. The resiliency of the cushioning members 32 and 34 permits limited vertical movement between the two arms and the enlarged aperture 28 permits limited movement of one arm relative to the other in a horizontal plane. I thus provide a simple ball and socket connection which absorbs vibrations in all directions.

I claim:

1. In an automotive vehicle including a frame and an engine, an arm rigid with the frame and provided with a concave socket, an arm rigid with the engine and having a convex lower surface adapted to nest in said socket, a concavo-convex pad of cushioning material interposed between the adjacent surfaces of the arm and socket, a connecting element extending from said arm through an enlarged aperture in said concave socket to permit said element to shift laterally relative to the socket, a retaining element on the lower end of said connecting element, and a washer of cushioning material between the lower side of the socket and said retaining element.

2. A mounting including a frame bracket having a concave socket, an engine arm having a convex face portion fitting said socket, non-metallic cushioning material interposed between the arm and socket, a hold down bolt passing through the arm and bracket, the opening through the bracket being of larger diameter than the bolt and a non-metallic cushioning member carried by the bolt and abutting the underside of said bracket.

3. A mounting including a supporting member having a concave surface, a supported member having a convex surface nesting in the concave surface of the supporting member, a concavo-convex cushion of non-metallic deformable material interposed between the two members, a retainer for said cushion and means to yieldingly hold said supported member on said cushion.

4. A vibration absorbing mounting including a supporting member having a socket of spherical segment shape, a supported member having a spherical segment portion nesting in said socket, a non-metallic elastic deformable sheet of substantially uniform thickness in said socket on which the supported member rests to insulate said members from each other and damp relative movement therebetween, and resilient means to hold the parts in assembled relation.

5. A mounting including a supporting member having a socket of spherical segment shape, a supported member having a spherical segment portion extending into said socket, a pad of non-metallic deformable material in said socket on which the supported member rests, a fastening element extending through the parts, and a pad of non-metallic deformable material interposed between said element and one of the members.

6. In an automotive vehicle including a frame and an engine, an arm rigid with the frame and provided with a socket of spherical segment shape, an arm rigid with the engine and having a lower surface of spherical segment shape adapted to nest within said socket, a relatively thin strip of cushioning material of substantially uniform thickness interposed between and conforming to the shape of the socket and lower surface of the engine arm, and means for fastening said arms together.

7. In an automotive vehicle including a frame and an engine, an arm rigid with the frame and provided with a socket of spherical segment shape, an arm rigid with the engine and having a lower surface of spherical segment shape adapted to nest within said socket, a relatively thin strip of cushioning material of substantially uniform thickness interposed between and conforming to the shape of the socket and lower surface of the engine arm, and means for resiliently holding said arms against relative displacement.

8. A vibration absorbing mounting for engines or the like comprising a metallic member having a cavity, a metallic member extending into the cavity and constituting therewith opposed walls within the confines of the cavity, cushioning material interposed between said walls to damp relative movement therebetween, and means for holding said walls and the cushioning material in cooperative relation, the said walls being arranged to resist relative motion of the two metallic members vertically and laterally.

9. A vibration absorbing mounting for engines or the like comprising two metallic members, one of which has a cavity and the other member including a projection disposed within the confines of the cavity and constituting therewith opposed walls, cushioning material disposed between said opposed walls to damp relative movement therebetween, and adjustable yieldable means for holding said walls and the cushioning material in cooperative working relation, the said walls being shaped to resist relative motion of the two members vertically and laterally.

10. A vibration absorbing mounting for engines or the like comprising a member having a parti-spherical cavity, a member having a parti-spherical projection disposed in said cavity, rubber composition interposed between the walls of said cavity and said parti-spherical projection to damp relative movement therebetween, and yielding means for holding the members and said rubber composition together.

11. A vibration absorbing mounting for engines or the like comprising a member having a parti-spherical cavity, a member having a parti-spherical projection disposed in said cavity, rubber composition interposed between the walls of said cavity and said parti-spherical projection to damp relative movement therebetween, a bolt, a nut therefor, and yielding means coacting with said bolt and nut to hold said rubber composition and said members in cooperative relation.

12. A cushioning connection comprising a member having a parti-spherical cavity, a member having a parti-spherical projection disposed in said cavity, rubber composition interposed between the walls of said cavity and said parti-spherical projection, a bolt extending through said members and said rubber composition in a manner to obviate transmission of vibrations from one member to the other, a nut for the bolt, yielding means comprising a rubber washer coacting with said bolt and nut to hold said members in cooperative relation, and a retainer cap having flanges adapted to confine said rubber washer.

13. A cushioning connection including a member having a cavity, a second member having a projection of similar contour but smaller dimensions than said cavity and disposed therein, rubber composition interposed between the walls of said cavity and said projection, a bolt adapted to pass through said members and said composition, a nut for the bolt, and a rubber washer cooperating with said bolt and nut to hold said rubber composition and said members together, said cavity and said projection being shaped to resist relative motion of the two members vertically and laterally.

14. A cushioning connection including a member having a rounded cavity, a second member having a rounded projection disposed in said cavity, rubber composition interposed between the walls of said cavity and said rounded projection, a headed bolt arranged to pass through said members and said composition, said bolt being clear of contact with one of said members, a nut for the bolt, a rubber washer between said nut and the adjacent member, and non-metallic insulation between the head of said bolt and the other member, said cavity and said projection being shaped to resist relative motion of the two members vertically and laterally.

15. In combination with a supporting member and the member to be supported, of a concave part on one of the members, a concavo-convex pad of cushioning material nested in said concave part, a convex part associated with the other member and nested within said concavo-convex cushioning pad, and yieldable means to hold the parts in assembly.

In testimony whereof I affix my signature.

BENJAMIN H. ANIBAL.